Nov. 11, 1924.
G. W. STOCKIN
1,515,526
CAR BRAKE
Filed May 4, 1922    2 Sheets-Sheet 1
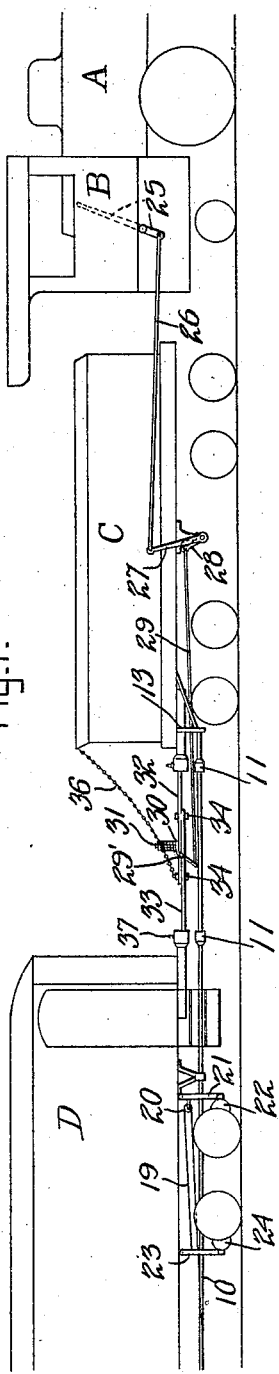
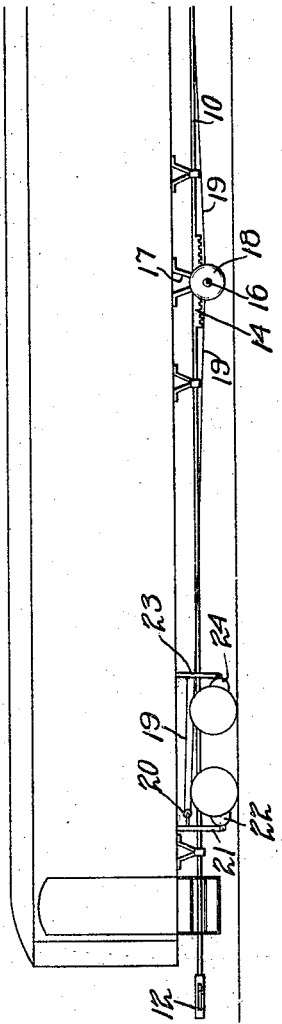
Inventor
George W. Stockin
By *[signature]*
Attorney Nov. 11, 1924.
G. W. STOCKIN
CAR BRAKE
Filed May 4, 1922
1,515,526
2 Sheets-Sheet 2
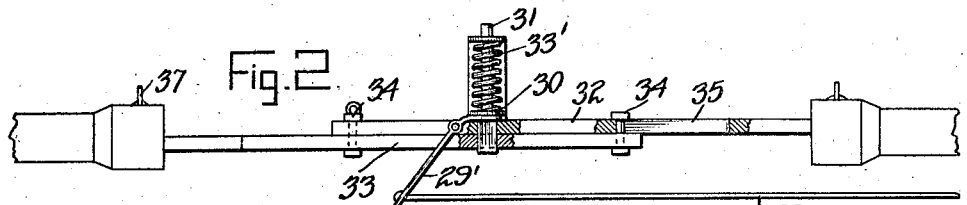
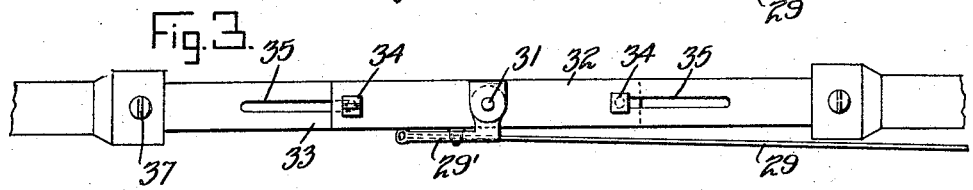
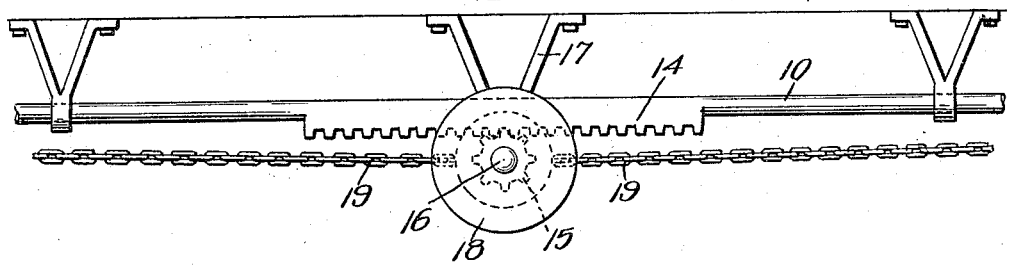
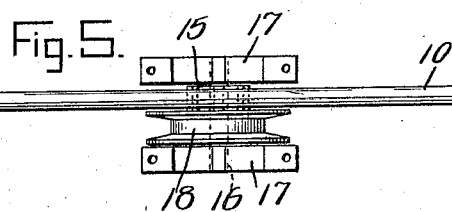
Inventor
George W. Stockin
By
Attorney Patented Nov. 11, 1924.

1,515,526

UNITED STATES PATENT OFFICE.

GEORGE W. STOCKIN, OF JACKSONVILLE, FLORIDA.

CAR BRAKE.

Application filed May 4, 1922. Serial No. 558,504.

*To all whom it may concern:*

Be it known that I, GEORGE W. STOCKIN, a citizen of the United States, residing at Jacksonville, in the county of Duval and State of Florida, have invented certain new and useful Improvements in Car Brakes, of which the following is a specification.

My said invention relates to improved brake applying means for railway trains and it is an object of the same to take advantage of the momentum of the train and cause the same to apply the brakes as the train nears its stopping point, or if for any reason it is desired to retard the movement of, or stop the train.

Referring to the accompanying drawings which are made a part hereof and on which similar reference characters indicate similar parts:—

Figures 1 and 1ª taken together constitute a side view of a part of a railway train, Figures 2 and 3 are details of a coupling for a pair of draw bars, and Figures 4 and 5 are details of a brake operating device.

In the drawings reference character A indicates an engine having a cab B and this engine is attached to a tank C and one or more cars D, these parts being all of conventional type. A control rod 10 extends throughout the length of the train, this rod being made up of a plurality of sections secured together between the foremost car D and tank C by threaded joints at 11, while the remaining joints may be in the form of turn buckles 12 between the successive cars. At its forward end the control rod is secured to a bracket 13 on the tank which prevents forward or backward movement of the control rod relative to the tank. Underneath each car and preferably about midway of the length of the car the control rod has formed thereon a rack 14 and this rack meshes with a pinion 15 fixed to a shaft 16 journaled in brackets 17 depending from the car. The shaft 16 also has fixed thereto a pulley 18 and a pair of chains 19 are secured to the pulley preferably at diametrically opposed points thereon. These chains 19 extend toward the ends of the car, passing about pulleys 20 attached to rockers 21 carrying brake shoes 22 at their lower ends and extending from the pulleys 20 to a second set of rockers 23 carrying brake shoes 24.

A hand lever 25 is located on the engine within reach of the engineer in the cab and this lever is connected by a link 26 to a rock arm 27 rigidly connected to a second rock arm 28 which by means of a link 29 operates a bent lever 29'. This bent lever at its forward end extends under a collar 30 secured to a sliding bolt 31 which is squared at its lower end to fit in square openings in a pair of draw bars 32 and 33 adapted to slide relatively to each other when released by retraction of the bolt. A spring 33' surrounds the upper rounded portion of the bolt and bears on the fixed collar 30 to force the bolt into locking engagement with the draw bars. As here shown the draw bars 32 and 33 are flat and are secured together by means of pins 34 each fixed to one of said members and extending through slots 35 in the other. A pair of chains 36 each secured at one end to an upper rear corner of the tank car C and at the other to the draw bar 33 serve to support the draw bars when uncoupled from the train at 37.

In the operation of the device the engineer will slow down the engine and will operate the hand lever 25 to release the bolt 31 whereupon the momentum of the train will cause the cars to move forward relatively to the control rod which is prevented from moving forward due to its attachment to the bracket 13 on the tank. The cars D, however move forward and the relative movement between the racks 14 on the control bars and the pinions 15 carried by the cars causes rotation of the pinions and the pulleys 18 secured thereto with the result that the chains 19 are wound upon the pulleys and therefore apply the brakes 22 and 24 to the respective wheels on the cars with constantly increasing force until the train stops.

Should it be desired to stop the train at the end of a backward movement thereof the operation will be the same since all that is necessary is that there shall be relative movement between the engine and tank on the one hand and the remainder of the train on the other hand and this will be permitted by disconnection of the bolt 31, whereupon the control rod which is secured to the brake 13 will be held against backward movement relative to the tank while the cars, being freed from the draw bar, will move backward relatively to the tank and so the brakes will be applied in the manner above described.

It will be understood that the showing of brakes in the drawings is purely a conventional one as any of the well known types of brakes or foundation brake gear may be arranged to cooperate with my improvements and it will also be understood that many other changes may be made in the devices shown in the drawings and described in the specification without departing from the spirit of my invention, the true scope of which is shown in the appended claims.

Having thus fully described my said invention, what I claim as new and desire to secure by Letters Patent, is:

1. In a train of vehicles comprising an impelling member and impelled members, a draw bar between said impelling member and said impelled members having separable sections, a pin extending through said sections and adapted to be retracted for permitting relative movement between said sections, a control rod secured subjacent said members, pulleys for supporting the control rod carried by said impelled members and brakes adapted to be operated by the control rod upon relative movement between the said impelled members and said control rod.

2. A train of vehicles comprising an impelling member, a separable draw bar connecting the impelling member to the remainder of the train, a bolt normally connecting said separable draw bar, a spring to retain said bolt in connecting position, a lever to retract said bolt and a handle on the impelling member whereby the engineer may operate the bolt to permit relative movement between the separate members of said draw bar whereby the relative movement applies said brakes.

3. A railway train comprising an engine, a tank and one or more cars, a control rod secured to the tank and extending underneath said cars, racks on said control rod underneath each of the cars, pinions carried by the cars and adapted to cooperate with said racks, pulleys rotatable with said pinions, chains secured to the pulleys and extending forward and backward underneath the respective cars, brakes at the front and rear of each car operable by said chains, upon relative movement between the cars and the control rod.

4. In a train of vehicles comprising an impelling member and impelled members, brakes on said impelled members, a brake control rod secured to said impelling member and supported subjacent said impelled members, racks on said control rod, pinions carried by the impelled members in cooperative relation with said racks, pulleys rotatable with said pinions, chains each having one end secured to a pulley and having its other end secured to said brakes, and manually controlled means for allowing relative movement between the impelling member and impelled members whereby the relative movement between the impelled members and the controlling rod apply said brakes.

5. In a train of vehicles comprising an impelling member and impelled members a draw bar between said impelling member and impelled members having relatively movable sections, brakes on said impelled members, a brake control rod secured subjacent said impelled members, racks on said control rod, pinions carried by the impelled members in cooperative relation with said racks, pulleys rotatable with said pinions, chains secured to the pulleys and extending forward and backward underneath the respective impelled members adapted to operate said brakes, a pin normally connecting the sections of said draw bar, a spring adapted to retain said pin in connecting position, a lever adapted to retract said pin and a handle on the impelling member whereby the engineer may operate the pin to allow relative movement of the sections of the draw bar.

6. In a train of vehicles comprising an impelling member, and impelled members, brakes on said impelled members, a brake control rod secured to said impelling member and supported subjacent said impelled members, means in engagement with said brake control rod for applying the brakes upon relative movement between said rod and the impelled members, and manually controlled means for allowing relative movement between the impelling member and the impelled members, substantially as set forth.

7. In a train of vehicles comprising an impelling member, and impelled members, brakes on said impelled members, a brake control rod secured to said impelling member and supported subjacent said impelled members, means in engagement with said brake control rod for applying the brakes upon relative movement between said rod and the impelled members, and spring actuated means for holding said impelling member and impelled members against relative movement substantially as set forth.

8. In a train of vehicles comprising an impelling member, and impelled members, brakes on said impelled members, a brake control rod secured to said impelling member and supported subjacent said impelled members, means in engagement with said brake control rod for applying the brakes upon relative movement between said rod and the impelled members, spring actuated means for holding said impelling member and impelled members against relative movement, and manually operable means for releasing said last mentioned spring actuated means, substantially as set forth.

9. In a train of vehicles comprising an impelling member and impelled members, a draw bar between said impelling member and said impelled members having separable sections, a bolt adapted to hold said sections against relative movement, means operable by the engineer for retracting said bolt, to permit relative movement between the sections of the draw bar, a control rod secured to the impelling member and extending subjacent the impelled members, and means operable by said control rod for applying the brakes upon relative movement between the sections of the draw bar.

In witness whereof, I have hereunto set my hand and seal at Jacksonville, Florida, this 25th day of April, A. D. nineteen hundred and twenty-two.

GEORGE W. STOCKIN. [L. S.]

Witnesses:
H. L. KNIGHT,
ELIZABETH E. SMITH.